July 15, 1969  R. L. LICH  3,455,251

ELECTRIC RAILWAY TRUCK WITH INTERGEARED MOTORS

Filed Feb. 20, 1967

INVENTOR
RICHARD L. LICH

BY *Bedell & Burgess*
ATTORNEYS 3,455,251
ELECTRIC RAILWAY TRUCK WITH
INTERGEARED MOTORS
Richard L. Lich, Town and Country, Mo., assignor to General Steel Industries, Inc., Granite City, Ill., a corporation of Delaware
Filed Feb. 20, 1967, Ser. No. 617,160
Int. Cl. B61c 3/00, 9/30, 9/38
U.S. Cl. 105—135      5 Claims

ABSTRACT OF THE DISCLOSURE

A railway vehicle truck having two axles, a frame supported thereon, two motors each supported from the frame adjacent one of the axles, means drivably connecting each motor shaft to the adjacent axle, and additional means mechanically coupling the motor shafts to each other.

---

The invention relates to railway rolling stock and consists particularly in an electric motor truck having improved rail adhesion characteristics.

In four-wheel motor trucks most commonly used, a motor is mounted between the center transom structure and each of the axles with its shaft parallel to the adjacent axle, to which it is mechanically coupled by a pinion on the end of the shaft meshed with a gear on the axle, the cooperating pinions and gears for each axle being on opposite sides of the truck from each other. With such typical arrangements, wheel slippage with consequent loss of adhesion occurs if both motors are not operating at identical speeds. Previous attempts to solve this problem have included application of side rods to the wheels, but this has not been satisfactory.

Among the objects of the invention are the provision of improved means for preventing wheel slippage in a four-wheel parallel drive electric motor truck, and to this end, the provision of a direct connection between the motor shafts.

The foregoing and additional more detailed objects and advantages are achieved by the invention described hereinafter and illustrated in the accompanying drawings, in which.

Figure 1:
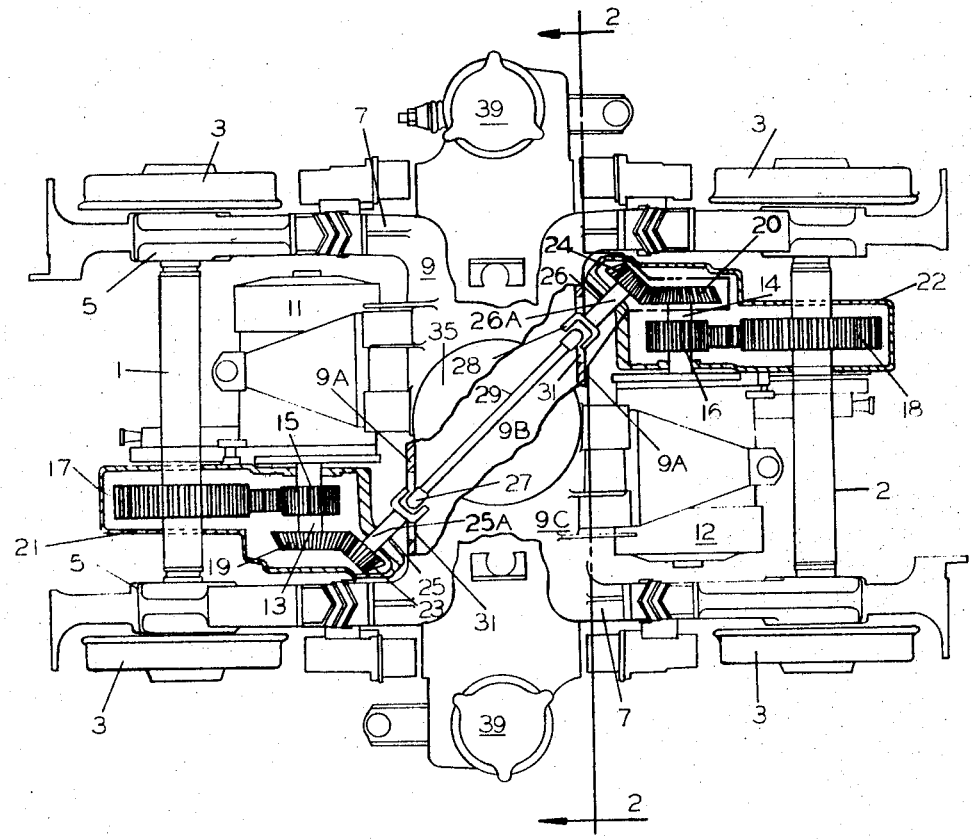
FIG. 1 is a top view, partially sectionalized, of a motor truck embodying the invention.
Figure 2:
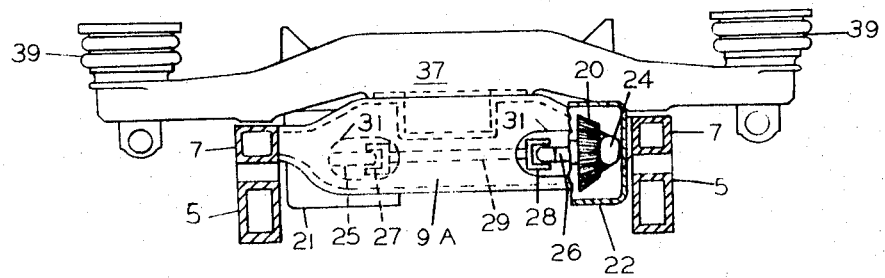
FIG. 2 is a transverse vertical sectional view along line 2—2 of FIG. 1.

The truck comprises a pair of parallel axles 1 and 2 spaced apart longitudinally of the truck and each mounting, at its ends, a pair of flanged wheels 3. Longitudinally extending transversely spaced side frames 5, 5, supported at their ends from axles 1 and 2 inboard of wheels 3, resiliently support a frame comprising side members 7 and transversely extending transom structure 9.

For driving the axles, traction motors 11 and 12 are supported from opposite sides of transom structure 9 between the latter and axles 1 and 2 respectively and the motor shafts 13 and 14 are extended from the motors in opposite directions transversely of the truck from each other, and in conventional manner mount drive pinions 15 and 16 respectively which are connected with driving gears 17 and 18 fixed on axles 1 and 2 respectively, so as to transmit driving torque from each motor to the associated axle.

Transom structure 9 is of box section having vertical side walls 9a, 9a spaced apart longitudinally of the truck, a bottom wall 9b and a top wall 9c.

For the purpose of preventing wheel slippage, both motor shafts 13 and 14 are extended beyond pinions 15 and 16 and mount at their ends bevel gears 19 and 20. Gear boxes 21 and 22 enclose pinion 15, gear 17 and bevel gear 19, and pinion 16, gear 18 and bevel gear 20 respectively.

Diagonally disposed bevel gears 23 and 24 meshing with bevel gears 19 and 20 are mounted respectively on aligned diagonally extending stub shafts 25 and 26, which are journaled at 25a and 26a in the gear box wall structure. Shafts 25 and 26 are connected by universal joints 27 and 28 to the opposite ends of diagonal shaft 29, thus forming a Cardan shaft, and transom structure side walls 9a, 9a are apertured as at 31, 31 to permit the passage through the transom structure of Cardan shaft 25, 29, 26 and the coupling thereby of motor shafts 13 and 14.

Top wall 9c of the transom structure may be provided with an upwardly facing central bearing 35, and a transverse bolster 37, provided at its ends with upstanding body-supporting springs 39, 39, may be swivelly supported on central bearing 35.

During operation of the truck, the coupling of the motor shafts effected by bevel gears 19, 23, shafts 25, 29, 26 and bevel gears 24 and 20 will constantly equalize the motor speeds and consequently through pinions 15 and 16, and driving gears 17 and 18, will equalize the speeds of axles 1 and 2, with resultant elimination of slipping and improved adhesion.

It will be understood that various changes in details of construction and arrangement of parts may be made by those skilled in the art without departing from the spirit of the invention as set forth in the appended claims.

What is claimed is:

1. A railway vehicle truck comprising a pair of wheeled axles spaced apart lengthwise of the truck, framing supported therefrom, a pair of motors each supported from said framing adjacent one of said axles and having a shaft parallel to the axles, gear means drivably connecting each motor shaft to the adjacent axle, said gear means on the respective motor shafts being positioned at opposite sides of the truck from each other, coupling means comprising a Cardan shaft extending diagonally across the truck and means connecting said Cardan shaft at its opposite ends to said motor shafts adjacent said axle connecting means, said last-named means comprising cooperating bevel gears on the ends of said Cardan shaft and on each said motor shaft, said Cardan shaft being supported solely at its ends, from said motor.

2. A railway vehicle truck according to claim 1 wherein said Cardan shaft comprises short end portions mounting said bevel gears, a longer intermediate portion, and universal joints connecting said intermediate portion and said end portions.

3. A railway vehicle truck according to claim 2 in which separate wall structures enclose said driving gear means of each of said motors and said bevel gears, said Cardan shaft short end portions being journaled in said wall structures.

4. A railway vehicle truck according to claim 1 in which said truck framing includes transverse structure intermediate said motors, said transverse structure being apertured to accommodate the passage therethrough of said Cardan shaft.

5. A railway vehicle truck according to claim 1 in which said truck framing includes transverse structure intermediate said motors, said transverse structure having side walls spaced apart transversely of the truck, said side walls being apertured near opposite sides of the truck from each other to accommodate the passage through said transverse structure of said Cardan shaft.

References Cited

UNITED STATES PATENTS

| | | | |
|---|---|---|---|
| 751,893 | 2/1904 | Aultman et al. | 105—29 |
| 757,380 | 4/1904 | Worth et al. | 74—661 XR |
| 851,540 | 4/1907 | Martin | 74—370 |
| 1,602,299 | 10/1926 | Bethel | 105—139 |
| 2,132,450 | 10/1938 | Wolf | 180—54 |
| 2,406,797 | 9/1946 | Buckendale. | |

ARTHUR L. LA POINT, Primary Examiner

H. BELTRAN, Assistant Examiner

U.S. Cl. X.R.

74—661, 665; 105—49, 52, 98; 180—49, 65